US007715862B2

(12) United States Patent
Riddington

(10) Patent No.: US 7,715,862 B2
(45) Date of Patent: May 11, 2010

(54) CODING SELECTION METHOD

(75) Inventor: Eddie Riddington, London (GB)

(73) Assignee: Nokia Corporation, Espoo (FI)

( * ) Notice: Subject to any disclaimer, the term of this patent is extended or adjusted under 35 U.S.C. 154(b) by 902 days.

(21) Appl. No.: 11/239,279

(22) Filed: Sep. 30, 2005

(65) Prior Publication Data

US 2006/0079266 A1    Apr. 13, 2006

(30) Foreign Application Priority Data

Oct. 8, 2004  (GB) ................. 0422394.7

(51) Int. Cl.
*H04B 7/00* (2006.01)
*H04M 7/20* (2006.01)

(52) U.S. Cl. .............. 455/522; 455/127.1; 455/13.4; 370/318

(58) Field of Classification Search ............ 455/69, 455/522, 571, 572, 115.1, 123, 125, 515, 455/436, 126, 127.1, 513, 13.4; 370/357, 370/330, 318, 345, 442, 329, 335
See application file for complete search history.

(56) References Cited

U.S. PATENT DOCUMENTS

| | | | |
|---|---|---|---|
| 6,751,488 B2 * | 6/2004 | Lee ................ | 455/575.3 |
| 6,983,166 B2 * | 1/2006 | Shiu et al. ............. | 455/522 |
| 2003/0153345 A1 * | 8/2003 | Cramer, III ............. | 455/522 |
| 2004/0004944 A1 * | 1/2004 | Petrus et al. ........... | 370/318 |
| 2004/0047425 A1 | 3/2004 | Itoh | |
| 2005/0176455 A1 * | 8/2005 | Krishnan et al. ....... | 455/522 |
| 2005/0208961 A1 * | 9/2005 | Willenegger ........... | 455/522 |
| 2006/0046738 A1 * | 3/2006 | Guan et al. ............. | 455/452.2 |
| 2006/0223445 A1 * | 10/2006 | Baker et al. ............ | 455/69 |
| 2006/0234741 A1 * | 10/2006 | Provvedi ................ | 455/513 |
| 2006/0246938 A1 * | 11/2006 | Hulkkonen et al. .... | 455/522 |
| 2007/0258402 A1 * | 11/2007 | Nakamata et al. ...... | 370/329 |

FOREIGN PATENT DOCUMENTS

| | | |
|---|---|---|
| CN | 1383335 A | 12/2002 |
| JP | EP1484934 A1 * | 12/2004 |
| WO | WO 00/13362 | 3/2000 |
| WO | WO 2004/102827 A2 | 11/2004 |

* cited by examiner

*Primary Examiner*—Sujatha Sharma
(74) *Attorney, Agent, or Firm*—Squire, Sanders & Dempsey, L.L.P.

(57) ABSTRACT

The invention relates to channel coding in the air interface in telecommunication systems, and specifically to methods used in selecting coding methods. The network utilizes information reported by a power control channel quality reporting procedure, such as reporting procedures used for Enhanced Power Control or Fast Power Control, for controlling the TFC selection.

30 Claims, 2 Drawing Sheets

CODING SELECTION METHOD

BACKGROUND OF THE INVENTION

1. Field of the Invention

The invention relates to channel coding in the air interface in telecommunication systems, and specifically to methods used in selecting coding methods.

2. Description of the Related Art

In Release 6 of the third generation partnership project (3GPP), a Flexible Layer One (FLO) based on similar principles that are used in Universal Terrestrial Radio Access Network (UTRAN), is being standardised for the Global System for Mobile communications/Enhanced Data for GSM Evolution (GSM/EDGE) Radio Access Network (GERAN). Instead of having fixed coding schemes in specifications, Flexible Layer One (FLO) provides a framework that allows one or more coding schemes to be defined at call set-up according to the quality of service (QoS) requirements of the service to be supported and expected conditions of the radio channel. In the terms used in 3GPP standards, these coding schemes are referred to as Transport Format Combinations (TFCs).

TFC selection refers to the process of adaptively selecting an appropriate TFC during transmission in order to adapt to changes in the radio environment such as due to fading. It is analogous to the well known 'link adaptation' operation used in Adaptive Multi-Rate (AMR) channels.

On the uplink (UL), maximum TFC selection is, according to standard versions current at the time of writing of this patent application, controlled by the network. The network can signal in-band on the downlink (DL) the maximum TFC that shall be used on the uplink. The network is able select the maximum TFC since the network is aware of the UL radio environment. A similar approach has been proposed for the downlink. In a known proposal, presented during TSG-GERAN meeting #21 (23-27 Aug. 2004), TFC selection would be controlled by the mobile station by signalling in-band on the UL, the maximum TFC that shall be used on the DL. Having the mobile station control the TFC selection in the downlink would be a natural choice, as the mobile station is aware of the DL radio environment. This approach is similar to 'link adaptation' operation used in AMR.

However, the aforementioned proposal has the drawback of placing additional processing requirements on the mobile station. Further, it would be advantageous to retain control of TFC selection in the network. For these reasons, this proposal was not incorporated in a standard. Consequently, no method exists to perform TFC selection on the downlink direction.

SUMMARY OF THE INVENTION

According to a first aspect of the invention, there is provided a method in a cellular telecommunication system for controlling selection of coding methods in the downlink direction of communication with a mobile station. According to this first aspect of the invention, the method comprises at least the steps of determining if a specific power control mechanism is enabled, if said specific power control mechanism is not enabled, sending an indication to the mobile station indicating that said specific power control mechanism is to be enabled, receiving a channel quality report from said mobile station associated with said specific power control mechanism, and selecting a coding method at least in part on the basis of said received channel quality report.

According to a second aspect of the invention, there is provided a method in a cellular telecommunication system for controlling selection of coding methods in the downlink direction of communication with a mobile station. According to the second aspect of the invention, the method comprises at least the steps of sending an indication to the mobile station indicating that a specific power control mechanism is to be enabled, receiving a channel quality report from said mobile station associated with said specific power control mechanism, and selecting a coding method at least in part on the basis of said received channel quality report.

According to a further advantageous embodiment of the invention, said specific power control mechanism is the Enhanced Power Control (EPC) mechanism.

According to a still further advantageous embodiment of the invention, said specific power control mechanism is the Fast Power Control (FPC) mechanism.

According to a further advantageous embodiment of the invention, the method further comprises the step of selecting a coding method at least in part on the basis of measurement results reflecting the diversity of the corresponding uplink direction of communication.

According to a third aspect of the invention, there is provided a system in a cellular telecommunications network for controlling selection of coding methods in the downlink direction of communication with a mobile station, comprising at least means for determining if a specific power control mechanism is enabled, means for sending, as a response to a determination that said specific power control mechanism is not enabled, an indication to the mobile station indicating that said specific power control mechanism is to be enabled, means for receiving a channel quality report from said mobile station associated with said specific power control mechanism, and means for selecting a coding method at least in part on the basis of said received channel quality report.

According to a fourth aspect of the invention, there is provided a system in a cellular telecommunications network for controlling selection of coding methods in the downlink direction of communication with a mobile station, comprising at least means for sending an indication to the mobile station indicating that a specific power control mechanism is to be enabled, means for receiving a channel quality report from said mobile station associated with said specific power control mechanism, and means for selecting a coding method at least in part on the basis of said received channel quality report.

According to a further advantageous embodiment of the invention, said specific power control mechanism is the EPC mechanism.

According to a still further advantageous embodiment of the invention, said specific power control mechanism is the FPC mechanism.

According to yet another advantageous embodiment of the invention, the system further comprises means for selecting a coding method at least in part on the basis of measurement results reflecting the diversity of the corresponding uplink direction of communication.

According to a fifth aspect of the invention, there is provided a system in a cellular telecommunications network for controlling selection of coding methods in the downlink direction of communication with a mobile station, comprising at least a controller configured to determine if a specific power control mechanism is enabled, a transmitter configured to send, as a response to a determination that said specific power control mechanism is not enabled, an indication to the mobile station indicating that said specific power control mechanism is to be enabled, a receiver configured to receive a channel quality report from said mobile station associated with said specific power control mechanism, and a controller configured to select a coding method at least in part on the basis of said received channel quality report.

According to a sixth aspect of the invention, there is provided a system in a cellular telecommunications network for controlling selection of coding methods in the downlink direction of communication with a mobile station, comprising at least a transmitter configured to send an indication to the mobile station indicating that a specific power control mechanism is to be enabled, a receiver configured to receive a channel quality report from said mobile station associated with said specific power control mechanism, and a controller configured to select a coding method at least in part on the basis of said received channel quality report.

According to a further advantageous embodiment of the invention, said specific power control mechanism is the EPC mechanism.

According to a still further advantageous embodiment of the invention, said specific power control mechanism is the FPC mechanism.

According to yet another advantageous embodiment of the invention, the system further comprises a controller configured to select a coding method at least in part on the basis of measurement results reflecting the diversity of the corresponding uplink direction of communication.

According to a seventh aspect of the invention, the inventive system is implemented in a network node of a cellular telecommunications network. Advantageously, the invention can be implemented in a base station.

According to a seventh aspect of the invention, there is provided a method in a cellular telecommunication system for controlling selection of coding methods in the downlink direction of communication with a mobile station. According to this seventh aspect of the invention, the method comprises at least the steps of receiving a channel quality report from said mobile station associated with a specific power control mechanism, and selecting a coding method at least in part on the basis of said received channel quality report.

BRIEF DESCRIPTION OF THE DRAWINGS

Embodiments of the present invention will now be described by way of example with reference to the accompanying drawings, in which.

DETAILED DESCRIPTION OF THE PREFERRED EMBODIMENTS

Figure 1:
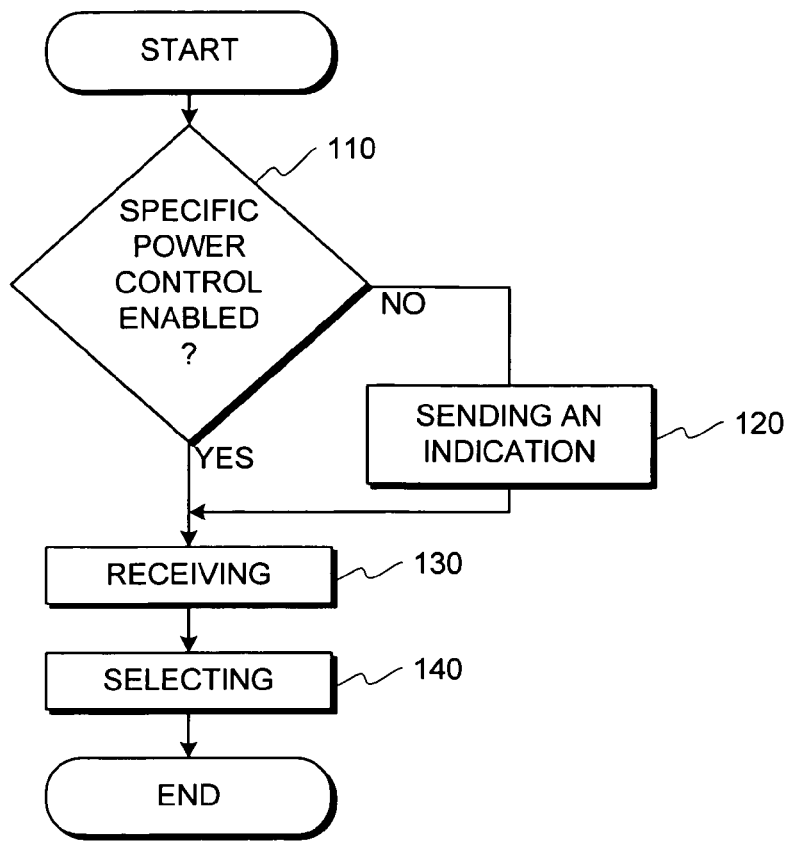
FIG. 1 illustrates a method according to an advantageous embodiment of the invention.

FIG. 1 illustrates a method according to an advantageous embodiment of the invention. In the example of FIG. 1, the method comprises determining at 110 if a specific power control mechanism is enabled. If said specific power control mechanism is not enabled, an indication is sent at 120 to the mobile station indicating that said specific power control mechanism is to be enabled. A channel quality report is then received at 130 from said mobile station associated with said specific power control mechanism, and a coding method can be selected at 140 at least in part on the basis of said received channel quality report.

Figure 2:
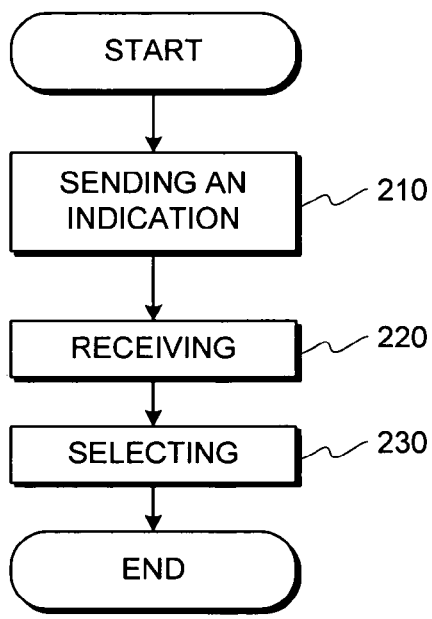
FIG. 2 illustrates a method according to a further advantageous embodiment of the invention.

FIG. 2 illustrates a further method according to a further advantageous embodiment of the invention. In the example of FIG. 2, the method comprises the steps of sending 210 an indication to the mobile station indicating that a specific power control mechanism is to be enabled, receiving 220 a channel quality report from said mobile station associated with said specific power control mechanism, and selecting 230 a coding method at least in part on the basis of said received channel quality report.

Figure 3:
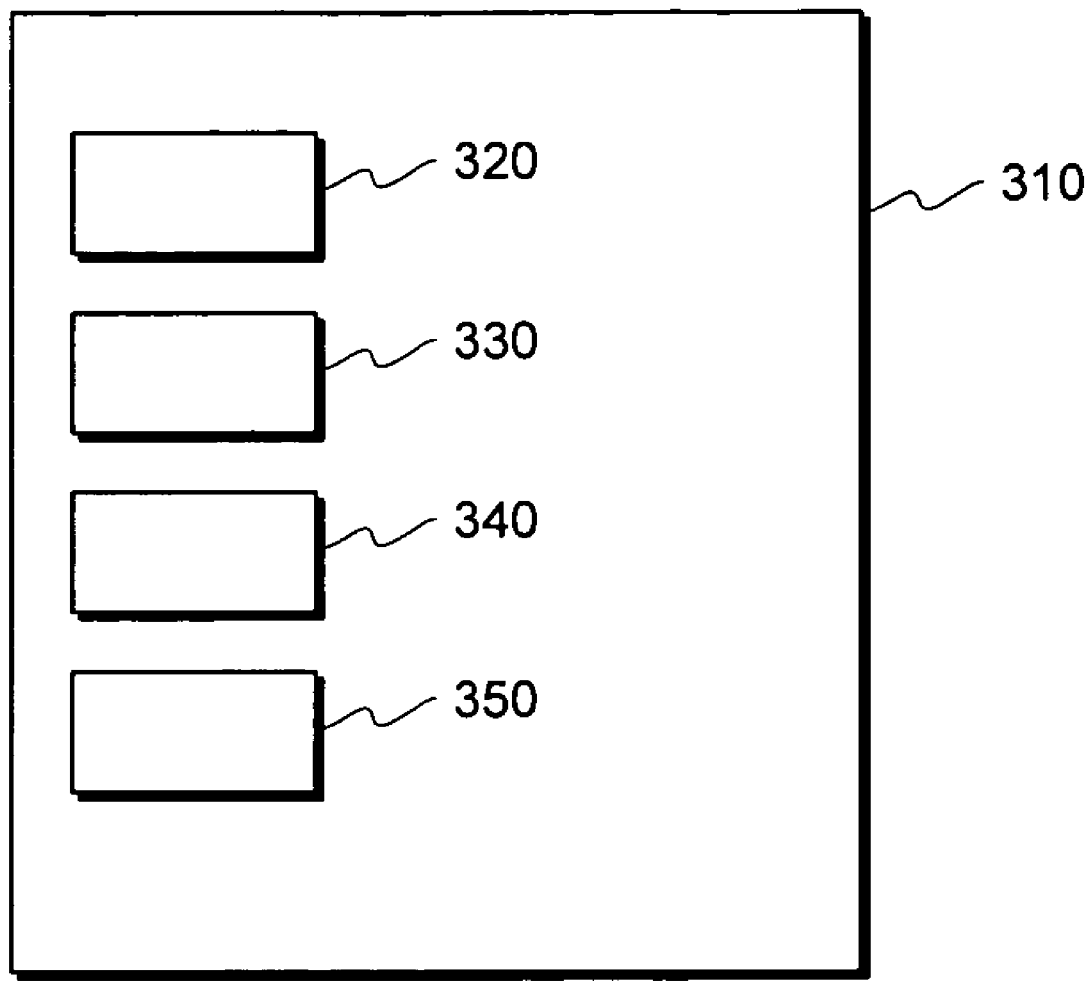
FIG. 3 illustrates a system according to a still further advantageous embodiment of the invention.

FIG. 3 illustrates a system according to an advantageous embodiment of the invention. In the example of FIG. 3, the system 310 comprises a controller 320 configured to determine if a specific power control mechanism is enabled, a transmitter 330 configured to send, as a response to a determination that said specific power control mechanism is not enabled, an indication to the mobile station indicating that said specific power control mechanism is to be enabled, a receiver 340 configured to receive a channel quality report from said mobile station associated with said specific power control mechanism, and a controller 350 configured to select a coding method at least in part on the basis of said received channel quality report.

The network may utilise information reported by a power control channel quality reporting procedure, such as reporting procedures used for Enhanced Power Control or Fast Power Control, for controlling the TFC selection.

Advantageously, the network can force the mobile to send channel quality reports periodically, for example every 120 ms, by enabling the Enhanced Power Control (EPC) feature by setting a specific flag in the Slow Associated Control CHannel (SACCH) block header, and thereafter use these channel quality reports for determining the appropriate TFC to use on the downlink. As this would also enable EPC in the downlink, where power control commands will be required to be sent every 120 ms, the network may if it wished, maintain normal power control (i.e. adjusting the transmission power once every 480 ms) by maintaining the same power level for four consecutive commands.

Decoding performance in the mobile station is generally dependent on the diversity of the channel, which is in turn dependent upon whether frequency hopping is employed or on how fast the mobile is moving. Unfortunately, the channel quality reports that are sent using EPC do not contain information correlating with diversity, as the channel quality reports roughly correspond to raw BER (bit error rate) before channel decoding. In a further advantageous embodiment of the invention, the network assumes similar channel diversity in the DL as on the UL and uses measurement results of fading, speed of mobile station, or other UL measurements correlated to or reflecting the diversity of the channel in determination of the appropriate TFC to be used on the DL.

According to a further advantageous embodiment of the invention, the network can initiate the Fast Power Control (FPC) mechanism instead. This embodiment has the advantage, that when FPC is in use the mobile station sends a channel quality report every 20 milliseconds. This would allow TFC selection control to react more quickly to changes in a fading channel, as in severe fading conditions a reaction time of the order of 120 ms may be too slow in practice.

The required controller functions can be provided either by a single controller entity or in a distributed manner. At least a part of the controller functions may be provided by a network node such as a base station or a radio network controller. For example, an appropriate controller entity may be provided in the network side such that it is configured to select a coding method of from a plurality of coding methods at least in part based on a received channel quality report from a mobile station. The controller entity may be configured to send an indication to the mobile station indicating that a specific power control mechanism is to be enabled. A radio network controller may also be configured to receive channel quality reports from mobile stations and to select an appropriate coding method of from a plurality of coding methods at least in part based on said received channel quality reports. The radio network controller may be further configured to send an indication to the mobile station indicating that said specific power control mechanism is to be enabled.

The required control functions may be provided by means of one or more data processors. Appropriately adapted computer program code product may be used for implementing the embodiments, when loaded to a computer, for example a processor of any of the nodes associated with a telecommunications system. The program code means may, for example, perform the generation of messages and/or information elements, interpretation and so forth. The program code product for providing the operation may be stored on and provided by means of a carrier medium such as a carrier disc, card or tape. A possibility is to download the program code product via a data network.

The invention has several advantages. The invention provides a way to control TFC selection in the downlink direction. Especially, the approach based on EPC would require no new signalling. EPC is a standardised 3GPP Rel-5 feature, and according to 3GPP Rel-5 standards support of EPC is mandatory in the mobile and optional in the network.

It is noted that while the preceding description illustrates various embodiments of the invention within a third generation (3G) cellular telecommunications system, the invention is not limited to a so called 3G cellular system, but can be implemented in different types of cellular telecommunication systems as well.

It is also noted herein that while the above describes exemplifying embodiments of the invention, there are several variations and modifications which may be made to the disclosed solution without departing from the scope of the present invention as defined in the appended claims.

The invention claimed is:

1. A method, comprising:
   determining whether a specific power control mechanism is enabled;
   when said specific power control mechanism is disabled, sending an indication to a mobile station indicating that said specific power control mechanism is to be enabled;
   receiving a channel quality report from said mobile station associated with said specific power control mechanism; and
   selecting a coding method of coding methods and/or a transport format combination at least in part based on said received channel quality report.

2. A method according to claim 1, wherein said specific power control mechanism is an Enhanced Power Control (EPC) mechanism.

3. A method according to claim 1, wherein said specific power control mechanism is a Fast Power Control (FPC) mechanism.

4. A method according to claim 1, further comprising:
   determining said coding method at least in part based on measurement results reflecting a diversity of a corresponding uplink direction of communication.

5. A method, comprising:
   sending an indication to a mobile station indicating that a specific power control mechanism is to be enabled;
   receiving a channel quality report from said mobile station associated with said specific power control mechanism; and
   selecting a coding method of coding methods and/or a transport format combination at least in part based on said received channel quality report.

6. A system, comprising:
   determining means for determining whether a specific power control mechanism is enabled;
   sending means for sending, as a response to a determination that said specific power control mechanism is disabled, an indication to a mobile station indicating that said specific power control mechanism is to be enabled;
   receiving means for receiving a channel quality report from said mobile station associated with said specific power control mechanism; and
   selecting means for selecting a coding method of coding methods and/or a transport format combination at least in part based on said received channel quality report.

7. A system, comprising:
   sending means for sending an indication to a mobile station indicating that a specific power control mechanism is to be enabled;
   receiving means for receiving a channel quality report from said mobile station associated with said specific power control mechanism; and
   selecting means for selecting a coding method of coding methods and/or a transport format combination at least in part based on said received channel quality report.

8. A system according to claim 6, wherein said specific power control mechanism is an Enhanced Power Control (EPC) mechanism.

9. A system according to claim 6, wherein said specific power control mechanism is a Fast Power Control (FPC) mechanism.

10. A system according to claim 6, further comprising:
    coding selecting means for selecting said coding method at least in part based on measurement results reflecting a diversity of a corresponding uplink direction of communication.

11. A system, comprising:
    a controller configured to determine whether a specific power control mechanism is enabled;
    a transmitter configured to send, as a response to the controller determining that said specific power control mechanism is disabled, an indication to a mobile station indicating that said specific power control mechanism is to be enabled;
    a receiver configured to receive a channel quality report from said mobile station associated with said specific power control mechanism; and
    a controller configured to select a coding method of coding methods and/or a transport format combination at least in part based on said received channel quality report.

12. A system according to claim 11, wherein said specific power control mechanism is an Enhanced Power Control (EPC) mechanism.

13. A system according to claim 11, wherein said specific power control mechanism is a Fast Power Control (FPC) mechanism.

14. A system according to claim 11, further comprising:
a controller configured to select said coding method at least in part based on measurement results reflecting a diversity of a corresponding uplink direction of communication.

15. A system, comprising:
a transmitter configured to send an indication to a mobile station indicating that a specific power control mechanism is to be enabled;
a receiver configured to receive a channel quality report from said mobile station associated with said specific power control mechanism; and
a controller configured to select a coding method of coding methods and/or a transport format combination at least in part based on said received channel quality report.

16. An apparatus, comprising:
a controller configured to determine whether a specific power control mechanism is enabled;
a transmitter configured to send, as a response to the controller determining that said specific power control mechanism is disabled, an indication to a mobile station indicating that said specific power control mechanism is to be enabled;
a receiver configured to receive a channel quality report from said mobile station associated with said specific power control mechanism; and
a controller configured to select a coding method of coding methods and/or a transport format combination at least in part based on said received channel quality report.

17. A base station, comprising:
a controller configured to determine whether a specific power control mechanism is enabled;
a transmitter configured to send, as a response to the controller determining that said specific power control mechanism is disabled, an indication to a mobile station indicating that said specific power control mechanism is to be enabled;
a receiver configured to receive a channel quality report from said mobile station associated with said specific power control mechanism; and
a controller configured to select a coding method of coding methods and/or a transport format combination at least in part based on said received channel quality report.

18. A method, comprising:
sending an indication to a mobile station indicating that a specific power control mechanism is to be enabled;
receiving a channel quality report from a mobile station associated with a specific power control mechanism; and
selecting a coding method of coding methods and/or a transport format combination at least in part based on said received channel quality report.

19. An apparatus, comprising:
a transmitter configured to send an indication to a mobile station indicating that a specific power control mechanism is to be enabled;
a receiver configured to receive a channel quality report from said mobile station associated with said specific power control mechanism; and
a controller configured to select a coding method of coding methods and/or a transport format combination at least in part based on said received channel quality report.

20. A base station, comprising:
a transmitter configured to send an indication to a mobile station indicating that a specific power control mechanism is to be enabled;
a receiver configured to receive a channel quality report from said mobile station associated with said specific power control mechanism; and
a controller configured to select a coding method of coding methods and/or a transport format combination at least in part based on said received channel quality report.

21. An apparatus, comprising:
a receiver configured to receive a channel quality report from a mobile station associated with a specific power control mechanism; and
a controller configured to select a coding method from a plurality of coding methods and/or a transport format combination at least in part based on said received channel quality report.

22. An apparatus according to claim 21, further comprising:
a transmitter configured to send an indication to the mobile station indicating that said specific power control mechanism is to be enabled.

23. A controller according to claim 21, further comprising:
a transmitter configured to send an indication to the mobile station indicating that said specific power control mechanism is to be enabled in response to detection that said specific power control mechanism is disabled.

24. A controller, comprising:
a receiver configured to receive a channel quality report from a mobile station associated with a specific power control mechanism; and
a selector configured to select a coding method from a plurality of coding methods and/or a transport format combination at least in part based on said received channel quality report.

25. A computer readable medium storing a computer program, the computer program being configured to control a processor to perform:
receiving a channel quality report from a mobile station associated with a specific power control mechanism; and
selecting a coding method from a plurality of coding methods and/or a transport format combination at least in part based on said processing of the channel quality report.

26. An apparatus, comprising:
determining means for determining whether a specific power control mechanism is enabled;
sending means for sending, as a response to the controller determining that said specific power control mechanism is disabled, an indication to a mobile station indicating that said specific power control mechanism is to be enabled;
receiving means for receiving a channel quality report from said mobile station associated with said specific power control mechanism; and
selecting means for selecting a coding method of coding methods and/or a transport format combination at least in part based on said received channel quality report.

27. An apparatus, comprising:
sending means for sending an indication to a mobile station indicating that a specific power control mechanism is to be enabled;

receiving means for receiving a channel quality report from said mobile station associated with said specific power control mechanism; and selecting means for selecting a coding method of coding methods and/or a transport format combination at least in part based on said received channel quality report.

28. An apparatus, comprising:

receiving means for receiving a channel quality report from a mobile station associated with a specific power control mechanism; and selecting means for selecting a coding method from a plurality of coding methods and/or a transport format combination at least in part based on said received channel quality report.

29. A computer readable medium storing a computer program, the computer program being configured to control a processor to perform:

determining whether a specific power control mechanism is enabled;

when said specific power control mechanism is disabled, sending an indication to a mobile station indicating that said specific power control mechanism is to be enabled;

receiving a channel quality report from said mobile station associated with said specific power control mechanism; and selecting a coding method of coding methods and/or a transport format combination at least in part based on said received channel quality report.

30. A computer readable medium storing a computer program, the computer program being configured to control a processor to perform:

sending an indication to a mobile station indicating that a specific power control mechanism is to be enabled;

receiving a channel quality report from said mobile station associated with said specific power control mechanism; and selecting a coding method of coding methods and/or a transport format combination at least in part based on said received channel quality report.

* * * * *